United States Patent
Kong et al.

(10) Patent No.: US 11,122,387 B2
(45) Date of Patent: *Sep. 14, 2021

(54) SUPER GEO-FENCES AND VIRTUAL FENCES TO IMPROVE EFFICIENCY OF GEO-FENCES

(71) Applicant: eBay Inc., San Jose, CA (US)

(72) Inventors: Rui Kong, Lake Oswego, OR (US); Chintan Jain, Ashburn, VA (US); Rajkumar Chinnakonda, Portland, OR (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,276

(22) Filed: Oct. 29, 2019

(65) Prior Publication Data
US 2020/0169839 A1    May 28, 2020

Related U.S. Application Data

(63) Continuation of application No. 16/208,910, filed on Dec. 4, 2018, now Pat. No. 10,492,025, which is a continuation of application No. 15/624,485, filed on Jun. 15, 2017, now Pat. No. 10,178,501, which is a continuation of application No. 14/503,340, filed on Sep. 30, 2014, now Pat. No. 9,712,968.

(51) Int. Cl.
*H04W 4/02* (2018.01)
*H04W 4/021* (2018.01)

(52) U.S. Cl.
CPC .................. *H04W 4/022* (2013.01)

(58) Field of Classification Search
CPC .................................... H04W 4/022
USPC ....................................... 455/456.1
See application file for complete search history.

(56) References Cited

U.S. PATENT DOCUMENTS

| 9,712,968 B2 | 7/2017 | Kong et al. |
| 10,178,501 B2 | 1/2019 | Kong et al. |

(Continued)

OTHER PUBLICATIONS

U.S. Appl. No. 14/503,340 U.S. Pat. No. 9,712,968, filed Sep. 30, 2014, Super Geo-Fences and Virtual Fences to Improve Efficiency of Geo-Fences.

(Continued)

*Primary Examiner* — Chuong A Ngo
(74) *Attorney, Agent, or Firm* — Schwegman Lundberg & Woessner, P.A.

(57) ABSTRACT

A system and method for using super geo-fences to improve efficiency of geo-fences is disclosed. A server system determines a geo-fence density based on a number of geo-fences in an area around a client system. In response to determining the geo-fence density is greater than a predetermined density value, the server system selects a number of geo-fences that is greater than a fixed number of geo-fences that the client system is capable of handling. The server system groups the selected geo-fences into a first and second group of geo-fences and generates a super geo-fence that encompasses the first group. The server system transmits the first and second group of geo-fences and the super geo-fence to an application stored at the client device. The application adds geo-fence data corresponding to the second group to the client system in response to detecting the client system crossing a boundary of the super geo-fence.

20 Claims, 12 Drawing Sheets

(56) References Cited

U.S. PATENT DOCUMENTS

| | | | |
|---|---|---|---|
| 10,492,025 | B2 | 11/2019 | Kong et al. |
| 2015/0141037 | A1 | 5/2015 | Saha et al. |
| 2015/0281889 | A1* | 10/2015 | Menendez ........ H04L 29/08657 455/456.1 |
| 2016/0042733 | A1* | 2/2016 | Yuan ..................... H04W 4/027 704/243 |
| 2016/0066141 | A1 | 3/2016 | Jain et al. |
| 2016/0094944 | A1 | 3/2016 | Kong et al. |
| 2017/0289757 | A1 | 10/2017 | Kong et al. |
| 2019/0104381 | A1 | 4/2019 | Kong et al. |

OTHER PUBLICATIONS

U.S. Appl. No. 15/624,485 U.S. Pat. No. 10,178,501, filed Jun. 15, 2017, Super Geo-Fences and Virtual Fences to Improve Efficiency of Geo-Fences.

U.S. Appl. No. 16/208,910 U.S. Pat. No. 10,492,025, filed Dec. 4, 2018, Super Geo-Fences and Virtual Fences to Improve Efficiency of Geo-Fences.

Applicant-Initiated Interview Summary received for U.S. Appl. No. 16/208,910, dated Jun. 11, 2019, 3 pages.

Non-Final Office Action received for U.S. Appl. No. 16/208,910, dated Mar. 8, 2019, 15 pages.

Notice of Allowance received for U.S. Appl. No. 16/208,910, dated Jul. 24, 2019, 9 pages.

Response to Non-Final Office Action filed on Jun. 27, 2019, for U.S. Appl. No. 16/208,910, dated Mar. 8, 2019, 12 pages.

Final Office Action received for U.S. Appl. No. 14/503,340, dated Oct. 27, 2016, 14 pages.

Non-Final Office Action received for U.S. Appl. No. 14/503,340, dated Feb. 12, 2016, 12 pages.

Notice of Allowance received for U.S. Appl. No. 14/503,340, dated Mar. 15, 2017, 9 pages.

Response to Final Office Action filed on Feb. 27, 2017, for U.S. Appl. No. 14/503,340, dated Oct. 27, 2016, 12 pages.

Response to Non-Final Office Action filed on Jul. 12, 2016, for U.S. Appl. No. 14/503,340, dated Feb. 12, 2016, 10 pages.

Advisory Action received for U.S. Appl. No. 15/624,485, dated Jun. 21, 2018, 2 pages.

Applicant-Initiated Interview Summary received for U.S. Appl. No. 15/624,485, dated Jul. 5, 2018, 3 pages.

Corrected Notice of Allowability received for U.S. Appl. No. 15/624,485, dated Sep. 17, 2018, 2 pages.

Decision on Pre Appeal Brief received for U.S. Appl. No. 15/624,485, dated Aug. 3, 2018, 2 pages.

Final Office Action received for U.S. Appl. No. 15/624,485, dated Apr. 19, 2018, 17 pages.

First Action Interview—Office Action received for U.S. Appl. No. 15/624,485, dated Oct. 18, 2017, 3 pages.

Notice of Allowance received for U.S. Appl. No. 15/624,485, dated Aug. 31, 2018, 9 pages.

Notice of Appeal filed on Jul. 19, 2018, for U.S. Appl. No. 15/624,485, 3 pages.

Preinterview First Office Action received for U.S. Appl. No. 15/624,485, dated Aug. 15, 2017, 5 pages.

Response to Final Office Action filed on May 25, 2018, for U.S. Appl. No. 15/624,485, dated Apr. 19, 2018, 10 pages.

Response to First Action Interview—Office Action filed on Jan. 18, 2018, for U.S. Appl. No. 15/624,485, dated Oct. 18, 2017, 17 pages.

Response to Pre-Interview First Office Action filed on Sep. 15, 2017, for U.S. Appl. No. 15/624,485, dated Aug. 15, 2017, 2 pages.

* cited by examiner

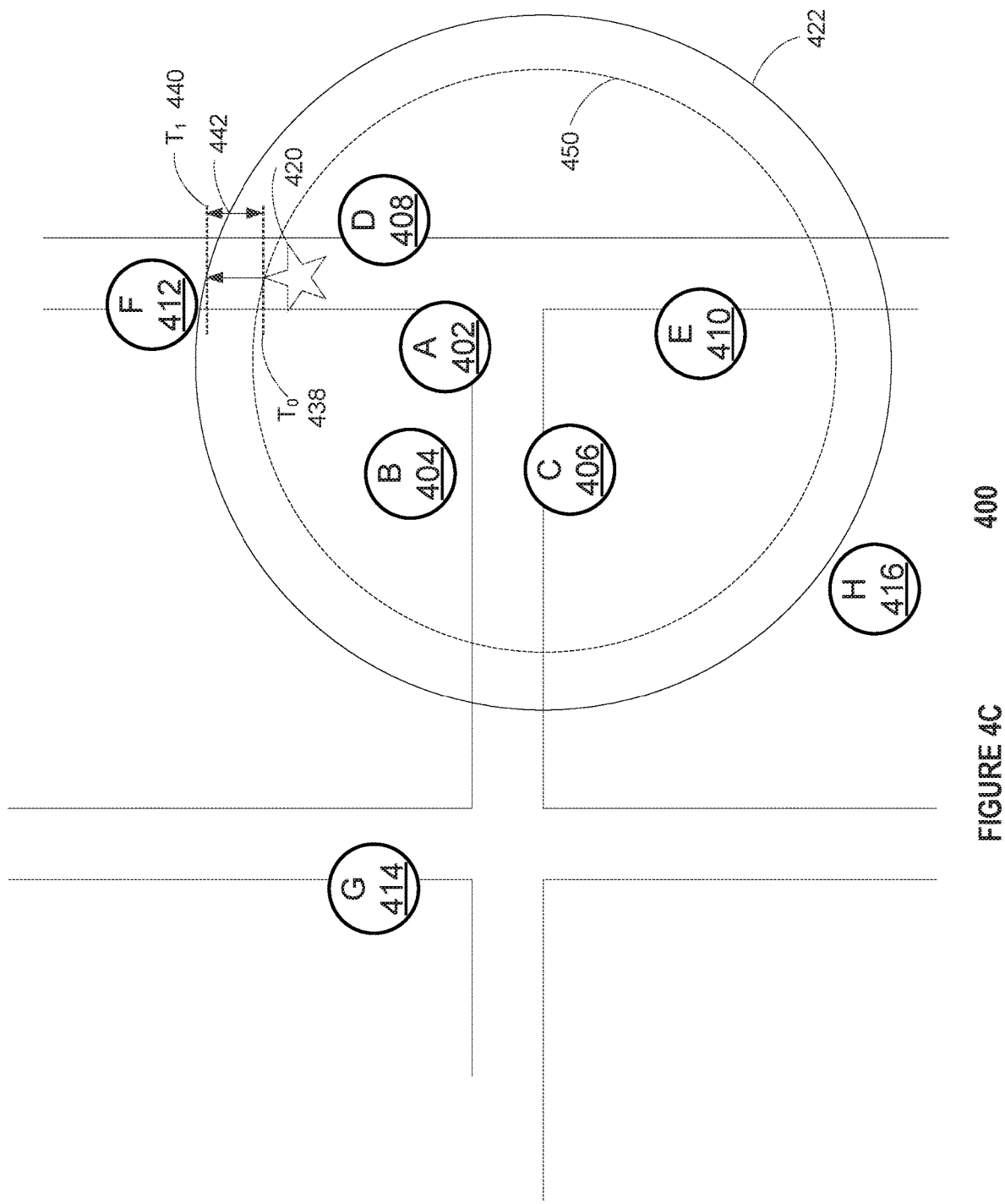

US 11,122,387 B2

SUPER GEO-FENCES AND VIRTUAL FENCES TO IMPROVE EFFICIENCY OF GEO-FENCES

PRIORITY CLAIM

This application is a continuation of and claims the priority of U.S. application Ser. No. 16/208,910, tiled Dec. 4, 2018, which is a continuation of and claims the priority of U.S. application Ser. No. 15/624,485, filed Jun. 15, 2017, which is a continuation of and claims the priority of U.S. application Ser. No. 14/503,340, filed Sep. 30, 2014, both of which are incorporated herein by reference in their entirety.

TECHNICAL FIELD

This application relates generally to the field of electronic devices and, in a specific example implementation, to providing location-based services.

BACKGROUND

The rise in electronic and digital device technology has rapidly changed the way society interacts with media and consumes goods and services. Digital technology enables a variety of consumer devices to be available that are very flexible and relatively cheap. Specifically, modern electronic devices, such as smart phones and tablets, allow a user to have access to a variety of useful applications even when away from a traditional computer. One useful application is the providing of location-based services using a position locating module to determine when a user crosses a boundary or is near a place of interest.

BRIEF DESCRIPTION OF THE DRAWINGS

The present description is illustrated by way of example, and not by way of limitation, in the figures of the accompanying drawings, in which:

FIGS. 4A-4C depict internal maps of the server system for the purpose of generating a super geo-fence, in accordance with some example embodiments.

Like reference numerals refer to corresponding parts throughout the drawings.

DETAILED DESCRIPTION

Figure 1:
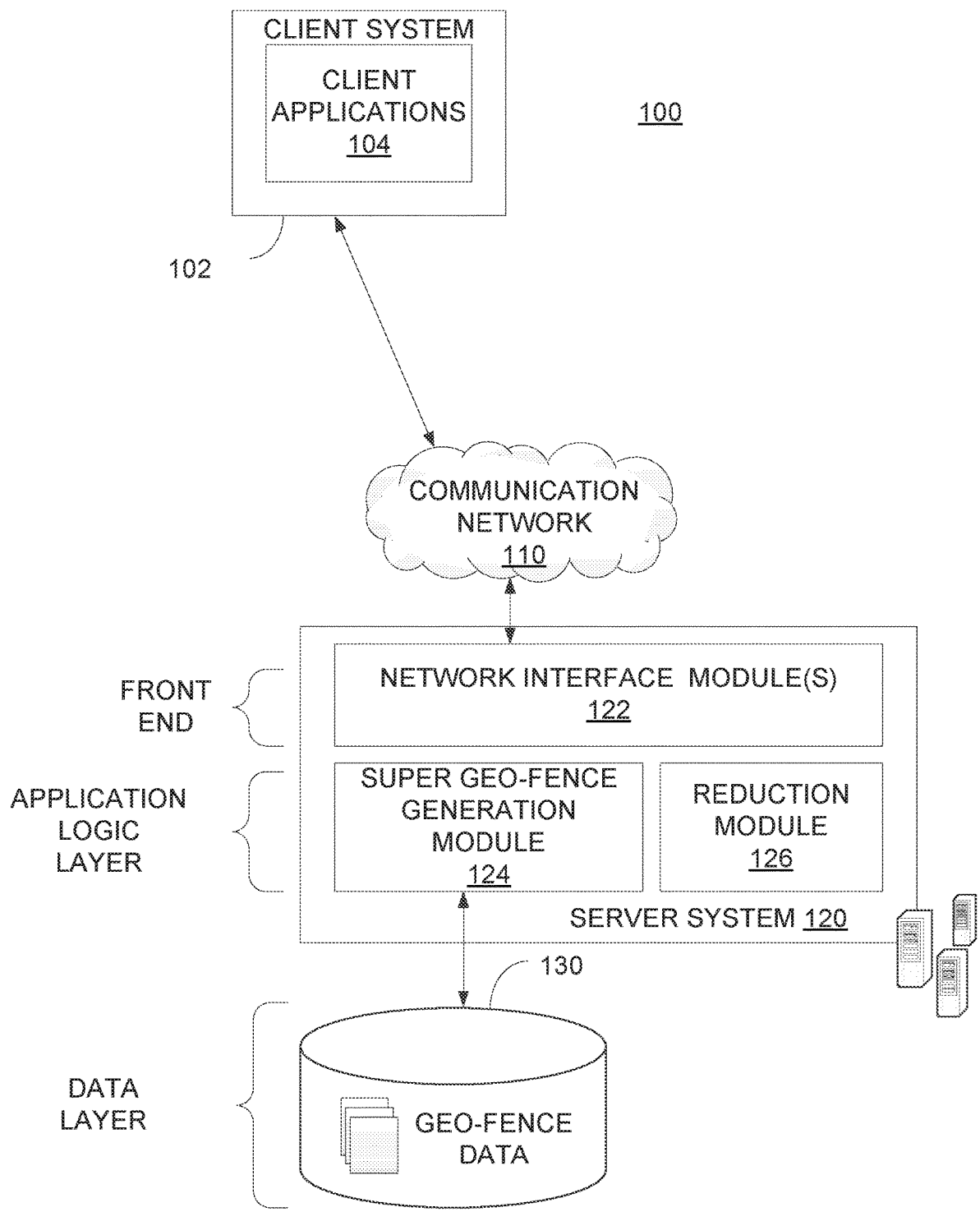
FIG. 1 is a block diagram illustrating a client-server system that includes one or more client systems and a server system, in accordance with some embodiments.

Although the implementations have been described with reference to specific example implementations, it will be evident that various modifications and changes may be made to these implementations without departing from the broader spirit and scope of the description. Accordingly, the specification and drawings are to be regarded in an illustrative rather than a restrictive sense.

In various implementations, methods and systems for significantly improving the efficiency of geo-fencing techniques using super-fences and virtual fence border protection are disclosed. A server system stores a plurality of geo-fences. Each geo-fence has an associated location and defined boundaries. For example, some geo-fences are defined by a central point (e.g., particular Global Positioning System (GPS) co-ordinates) and a radius distance. Any point within the radius distance from the central point is within the geo-fence and all other points are outside the geo-fence. Other geo-fences can be in any shape and have specific boundaries defined (e.g., by establishing the vertices of the shape).

A server system receives a request for additional geo-fence data from a client system (e.g., a smart phone). In some example embodiments, the request is generated at the client system in response to the client system crossing a super geo-fence that represents the farthest geo-fence for which it has data. The server system determines one or more geo-fences that are appropriate for the client system. This determination can be made based on a number of factors, including the location of the client system, the time to reach value associated with each of the possible geo-fences, the preferences of the users (e.g., what types of geo-fences they are currently interested in), and so on.

The server system then generates a super geo-fence that encompasses some or all of the geo-fences that have been selected. Thus, the super geo-fence is a geo-fence created by the server system that has boundaries such that some or all of the selected geo-fences are within its boundaries and it is as large as possible without covering any other geo-fences (e.g., geo-fences that are not selected).

The server system determines a reduction factor for the super fence. A reduction factor is an amount that the server system uses to shrink the super geo-fence. This is important because the normal size of the super geo-fence (as large as possible without encompassing other geo-fences) results in a problem wherein one or more geo-fence is located just beyond the border of the super-fence. When the client device crosses the super geo-fence boundary, the client system sends a request for additional geo-fence data to the server system. However, during the time needed to send the request and receive the response from the server system, the client system will have moved such that one or more geo-fence boundaries are missed. Thus, the reduction factor shrinks the size of the super geo-fence so that the response from the server system is received before any geo-fences are missed.

In some example embodiments, the reduction factor is a fixed amount, such as 1 mile. Thus, the diameter of the super geo-fence is reduced by 1 mile. In other embodiments the reduction factor is a percentage of the actual size of the super geo-fence. For example, the reduction factor is 10% of the total size of the super geo-fence. In other embodiments the reduction factor is based on the estimated speed (e.g., based on data received from the client system) of the client system and the time to reach the boundary of the super geo-fence. The server system reduces the size of the super geo-fence such that there is a certain amount of travel time from the boundary of the reduced-size super geo-fence to the boundary of the original super geo-fence. For example, the time can be a fixed time like 30 seconds or an estimated time to transmit new geo-fence data to the client system.

In some cases, there are too many geo-fences in too small an area (e.g., the geo-fences are too densely packed) to effectively reduce the size of the super geo-fence. In this case, the server system will send a number of geo-fences to the client system that is greater than what the client system can natively handle (e.g., some client systems can only natively handle data from ten geo-fences at a time). The extra geo-fence data is stored with a customized application provided by the server system and loaded onto the client system (e.g., a specific app that interacts with the server system).

The application will then manage the extra geo-fence data, sending it to the client system as needed. Thus, as the client system moves, the application will ensure that the client system has the appropriate geo-fence data for its current location.

In other cases, the server system deals with a too dense situation by grouping the extra geo-fences into a separate super geo-fence. The server system then transmits some or all of the selected geo-fences and the two super geo-fences to the client system.

FIG. 1 is a block diagram illustrating a client-server system 100 that includes one or more client systems 102 and a server system 120. One or more communication networks 110 interconnect these components. The communication network 110 may be any of a variety of networks, including local area networks (LAN), wide area networks (WAN), wireless networks, wired networks, the Internet, personal area networks (PAN), or a combination of such networks.

In some example embodiments, the client system 102 is an electronic device, such as a personal computer (PC), a laptop, a smartphone, a tablet, a mobile phone, a wearable computing device, or any other electronic device capable of communication over the communication network 110. Some client systems 102 include one or more client applications 104, which are executed by the client system 102. In some example embodiments, the client application(s) 104 include one or more applications from a set including search applications, communication applications, productivity applications, storage applications, word processing applications, travel applications, or any other useful applications. The client system 102 uses the client application(s) 104 to communicate with the server system 120 and transmit data to, and receive data from, the server system 120.

In some example embodiments, as shown by way of example in FIG. 1, the server system 120 generally includes three types of components, including front-end components, application logic components, and data components (or layers). As is understood by skilled artisans in the relevant computer and Internet-related arts, each module or engine shown in FIG. 1 represents a set of executable software instructions and corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with the server system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although depicted in FIG. 1 as a three component type of architecture, the various example embodiments are by no means limited to this architecture.

As shown by way of example in FIG. 1, the server system 120 includes network interface module(s) (e.g., a web server) 122, which receives data from various client systems 102, and communicates data back to the appropriate client systems 102 when appropriate. For example, the network interface module(s) 122 receives a geo-fence data request from the client system 102 and transmits the geo-fence data request to a super geo-fence generation module 124. The super geo-fence generation module 124 accesses a geo-fence database 130 to determine one or more geo-fences and generates a super geo-fence based on the determined geo-fences. The network interface module(s) 122 then transmits the geo-fence data associated with the determined one or more geo-fences and the generated super geo-fence to the requesting system.

As shown by way of example in FIG. 1, the data components include the geo-fence database 130 for storing data associated with each geo-fence in a plurality of geo-fences. The terms "database," "data," "dataset," and "data storage" are used interchangeably in the specification to refer to data that may or may not be stored in a specific database depending on the exact configuration used in a particular embodiment. Geo-fence data includes, but is not limited to, a geographic location of a geo-fence, a user or entity associated with the geo-fence (e.g., a corporation who owns a store at a particular location), time data for a geo-fence (e.g., the geo-fence is only active during hours that the restaurant is open), and geo-fence profile information.

The application logic components include the super geo-fence generation module 124 and a reduction module 126. The super geo-fence generation module 124 identifies one or more geo-fences based on the location of the client system 102. The super geo-fence generation module 124 then generates a super geo-fence based on the identified geo-fences. The application logic components can be implemented in any combination of hardware and/or software modules as needed.

A super geo-fence is a fence created by the server system (e.g., server system 120). A super geo-fence is created to encompass some or all the identified geo-fences. Thus, the locations of some or all the identified geo-fences are all within the area covered by the super geo-fence. The super geo-fence is made as big as possible without covering any non-selected geo-fences (e.g., any geo-fence that was not selected by the super geo-fence generation module 124). The super geo-fence serves as a trigger to let the client system 102 know when to request additional geo-fence data. Thus, when the boundary of the geo-fence is reached, the server system (e.g., system 120) knows that the client system has moved beyond the selected geo-fences and needs additional geo-fence data.

The reduction module 126 calculates a reduction value that is used to reduce the size of the super geo-fence. The reduction value helps solve a problem with super geo-fences. The problem that exists is that when a geo-fence is located just outside the super geo-fence generation module 124, the client system 102 misses any geo-fence boundaries that occur before the new data is received from the server system 120. In this case, the client system 102 crosses the super geo-fence boundary and sends a request to the server system 120. By the time the server system 120 responds, the client system 102 can already be past one or more geo-fence boundaries. As such, the reduction module 126 calculates an amount by which to shrink the super geo-fence to avoid this problem.

The reduction module 126 calculates a reduction factor. The reduction module 126 uses the reduction factor to reduce the total size of the super geo-fence. In some example embodiments, the reduction factor is a fixed amount that is applied to all super geo-fences. For example, the fixed amount is one mile. In other embodiments the reduction factor is a percentage of the total size of the super geo-fence. For example, the reduction factor is ten percent (10%) of the total size of the fence. If the super geo-fence is initially ten miles across (diameter), the reduction module 126 will reduce the super geo-fence to nine miles across (reduced by 10%).

In other embodiments, the reduction factor is based on an estimated travel time for the client system 102. The reduction module 126 calculates an estimated time needed to travel from the current location associated with a particular client system (e.g., a smart phone) to at least one boundary of the super geo-fence.

An estimated time to reach value (e.g., the time to reach a boundary of a geo-fence) is calculated by the reduction module 126 by first determining a mode of travel for the user associated with the respective client system 102. The mode of travel can be determined based on user profile information stored about the user (e.g., preferred mode of travel), speed and location data received from the respective client system 102 (e.g., how fast the user is travelling and the path they are taking), time and date information, and other factors. For example, if the client system 102 determines that the user is travelling at a speed of 1 to 3 miles per hour through a public park without roads on a Saturday afternoon, the server system 120 may determine that the user is walking. In another example, if the user is travelling at 75 miles per hour down a major highway, the server system 120 determines that the user is traveling by car.

Once the server system 120 has determined a mode of transportation for the user of the client system 102, the server system 120 can then determine the most likely route from the current location of the respective client system 102 and at least one boundary of the super geo-fence. For example, in some cases the most likely route is a direct route between the two points. This is especially likely if there are no obstacles between the points. However, often the mode of travel and various obstacles result in a likely path that is not a direct line between the two points. Instead, the user might have to avoid an obstacle (e.g., a river with only one nearby bridge) or need to follow a certain path (e.g., a car needs to follow a road). Thus, the server system 120 plots a path taking these considerations into account. The server system 120 might also take into account information about the user's past habits (e.g., the user habitually comes home from work on a particular path).

Once the server system 120 has determined a most likely route home, the server system 120 determines the total distance travelled. For example, the server system 120 adds up all the legs of the planned route to determine the total distance traveled. The server system 120 can then estimate the travel time needed to travel the planned route. In some example embodiments, the estimated travel time is based on the determined mode of travel. For example, if the total distance of the route is 10 miles and the determined mode of travel is a car going 60 miles per hour, the server system 120 determines the user will arrive at the boundary of the super geo-fence in six minutes. However, if the determined mode of travel is walking (e.g., 2 miles per hour), then the server system 120 determines that the user will arrive at the boundary of the super geo-fence in five hours.

The reduction module 126 then bases the reduction factor on a time to reach the newly reduced boundary. For example, the reduction module 126 determines that the super geo-fence should be reduced such that the travel time from the new super geo-fence to the original boundary of the super geo-fence is 75 seconds. Then, the reduction module 126 sets the reduction factor such that the amount that the super geo-fence is reduced by will result in a time-to-reach of 75 seconds from the current boundary of the super geo-fence to the original boundary of the super geo-fence.

Figure 2:
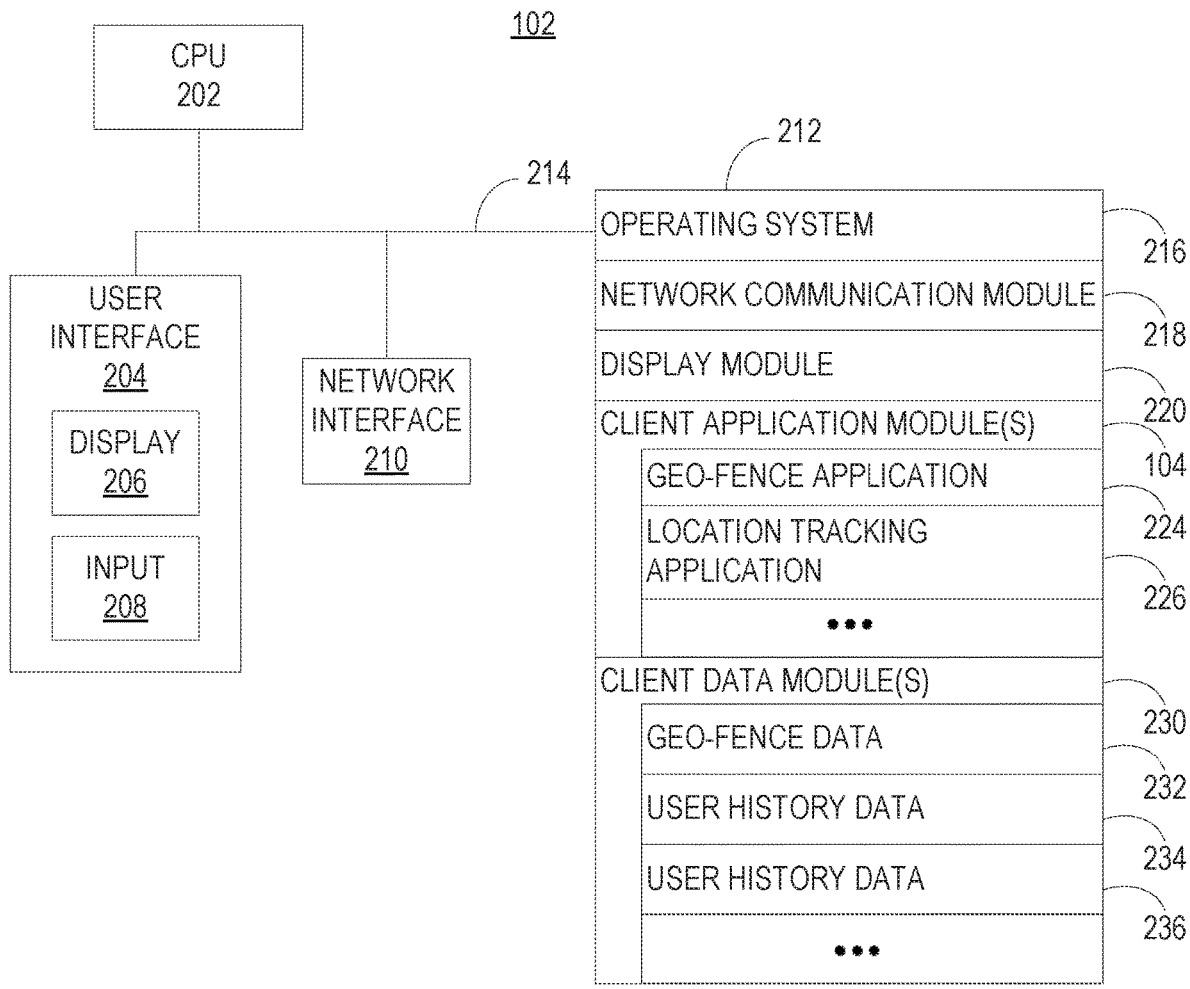
FIG. 2 is a block diagram illustrating a client system, in accordance with some embodiments.

FIG. 2 is a block diagram further illustrating the client system 102, in accordance with some example embodiments. The client system 102 typically includes one or more central processing units (CPUs) 202, one or more network interfaces 210, memory 212, and one or more communication buses 214 for interconnecting these components. The client system 102 includes a user interface 204. The user interface 204 includes a display device 206 and optionally includes an input means such as a keyboard, mouse, a touch sensitive display, or other input buttons 208. Furthermore, the client system 102 may use a microphone and voice recognition to supplement or replace the keyboard as a means of input.

Memory 212 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a non-transitory computer readable storage medium.

In some example embodiments, memory 212, or the computer readable storage medium of memory 212, stores the following programs, modules, and data structures, or a subset thereof:
- an operating system 216 that includes procedures for handling various basic system services and for performing hardware dependent tasks;
- a network communication module 218 used for connecting the client system 102 to other computers via the one or more communication network interfaces 210 (wired or wireless) and one or more communication networks (e.g., communication network 110 of FIG. 1), such as the Internet, other WANs, LANs metropolitan area networks (MANS), etc.;
- a display module 220 for enabling the information generated by the operating system 216 to be presented visually as needed;
- one or more client applications 104 for handling various aspects of requesting and receiving numbers, including but not limited to:
  - a geo-fence application 224 for comparing the current location of the client system 102 with the geo-fence boundaries stored in geo-fence data 232 and, in accordance with a determination that a boundary has been crossed, sending a notification either for display to a user or to a server system (e.g., server system 120 in FIG. 1); and
  - a location tracking application 226 for determining the current location of the client system 102 using a GPS system or other appropriate device or system; and
- client system data module(s) 230 for storing data at the client system 102, including but not limited to:
  - geo-fence data 232 including data that describes the location and boundaries of one or more geo-fences;
  - user history data 234 including data about past travel history of a user including locations traveled to, mode of travel, path chosen, speed of travel, geo-fences encountered, and any other information about a user's past history with the server system (e.g., server system 120 in FIG. 1); and user history data 236 including profile data regarding the user associated with the client system 102 including, but not limited to, demographic information about the user, user interest information, user history information, and any other information regarding the user.

Figure 3:
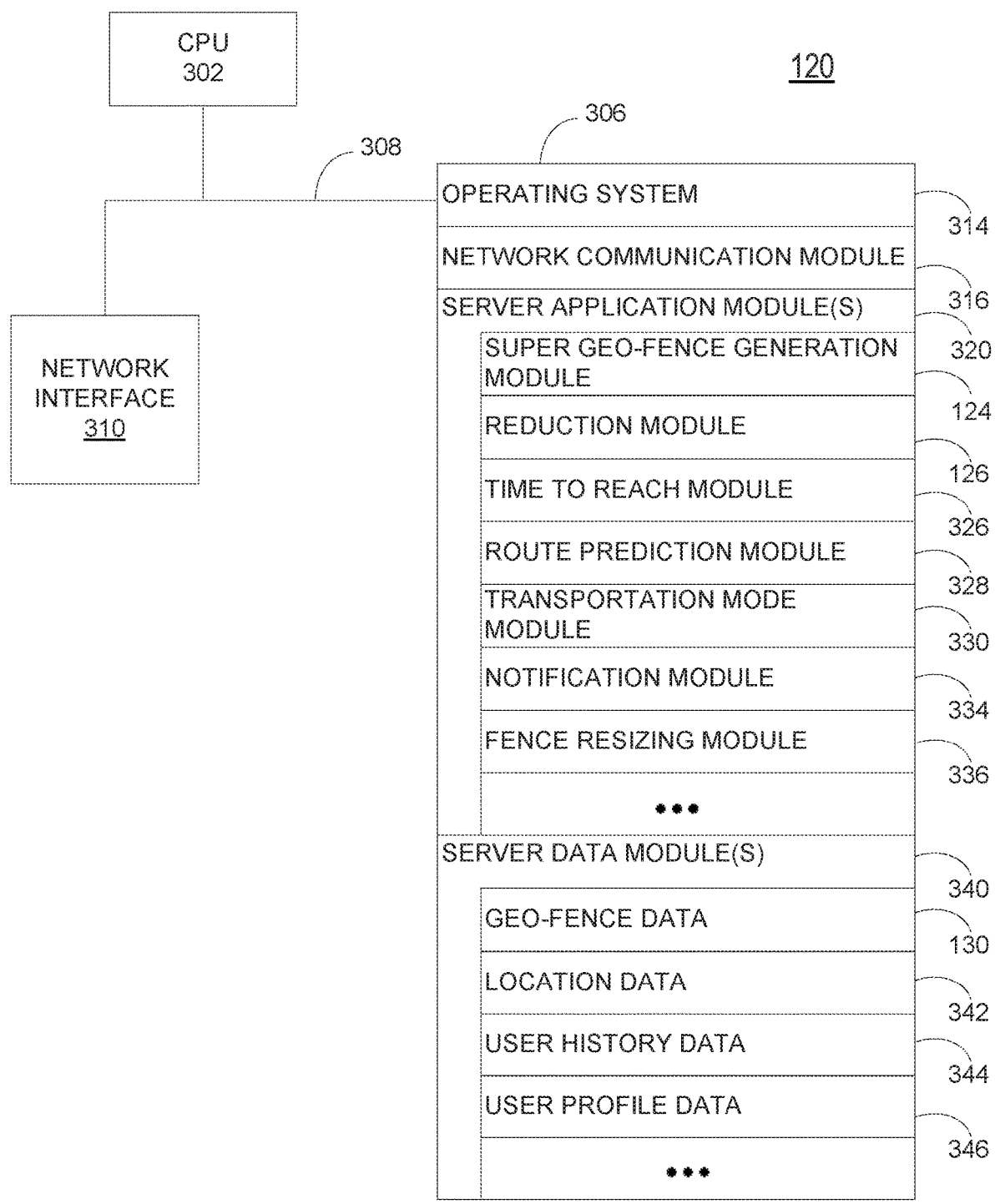
FIG. 3 is a block diagram illustrating a server system, in accordance with some embodiments.

FIG. 3 is a block diagram illustrating the server system 120, in accordance with some embodiments. The server system 120 typically includes one or more central processing units (CPUs) 302, one or more network interfaces 310, memory 306, and one or more communication buses 308 for interconnecting these components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302.

Memory 306, or alternately the non-volatile memory device(s) within memory 306, comprises a non-transitory computer readable storage medium. In some embodiments, memory 306 or the computer readable storage medium of memory 306 stores the following programs, modules, and data structures, or a subset thereof:

- an operating system 314 that includes procedures for handling various basic system services and for performing hardware dependent tasks;
- a network communication module 316 that is used for connecting the server system 120 to other computers via the one or more communication network interfaces 310 (wired or wireless) and one or more communication networks, such as the Internet, other WANs, LANS, MANs, and so on;
- one or more server application modules 320 for performing the services offered by server system 120, including but not limited to:
  - the super geo-fence generation module 124 for creating super geo-fences based on a set of geo-fences such that the set of geo-fences is encompassed by the super geo-fence;
  - the reduction module 126 for calculating a factor by which to reduce the size of a generated super geo-fence;
  - a time to reach module 326 for determining an estimated time needed to reach at least one boundary of a respective geo-fence;
  - a route prediction module 328 for determining a predicted route for a user based on current position, current speed, user history for a given user, and compiled user history for all the users of the server system (e.g., server system 120 in FIG. 1);
  - a transportation mode module 330 for determining the mode of transportation currently being used by a user of a client system (e.g., server system 102 in FIG. 1) based on the user's location, speed, and user profile data 346;
  - a notification module 334 for notifying a user or the server system (e.g., server system 120 in FIG. 1) when the user comes within a predetermined distance or time to reach of one or more boundaries of a geo-fence;
  - a fence resizing module 336 for adjusting a super geo-fence based on a reduction factor determined by the reduction module 126; and
- server data module(s) 340, holding data related to server system 120, including but not limited to:
  - geo-fence database 130 including location and size data for a plurality of geo-fences;
  - location data 342 including location and position information for one or more client systems (e.g., server system 102 in FIG. 1);
  - user history data 344 including data about past travel history of one or more users including locations traveled to, mode of travel, path chosen, speed of travel, geo-fences encountered and any other information about a user's past history with the server system 120; and
  - user profile data 346 including profile data regarding the user associated with the client system 102 including, but not limited to, demographic information about the user, user interest information, user history information, and any other information regarding the user.

Figure 4A:
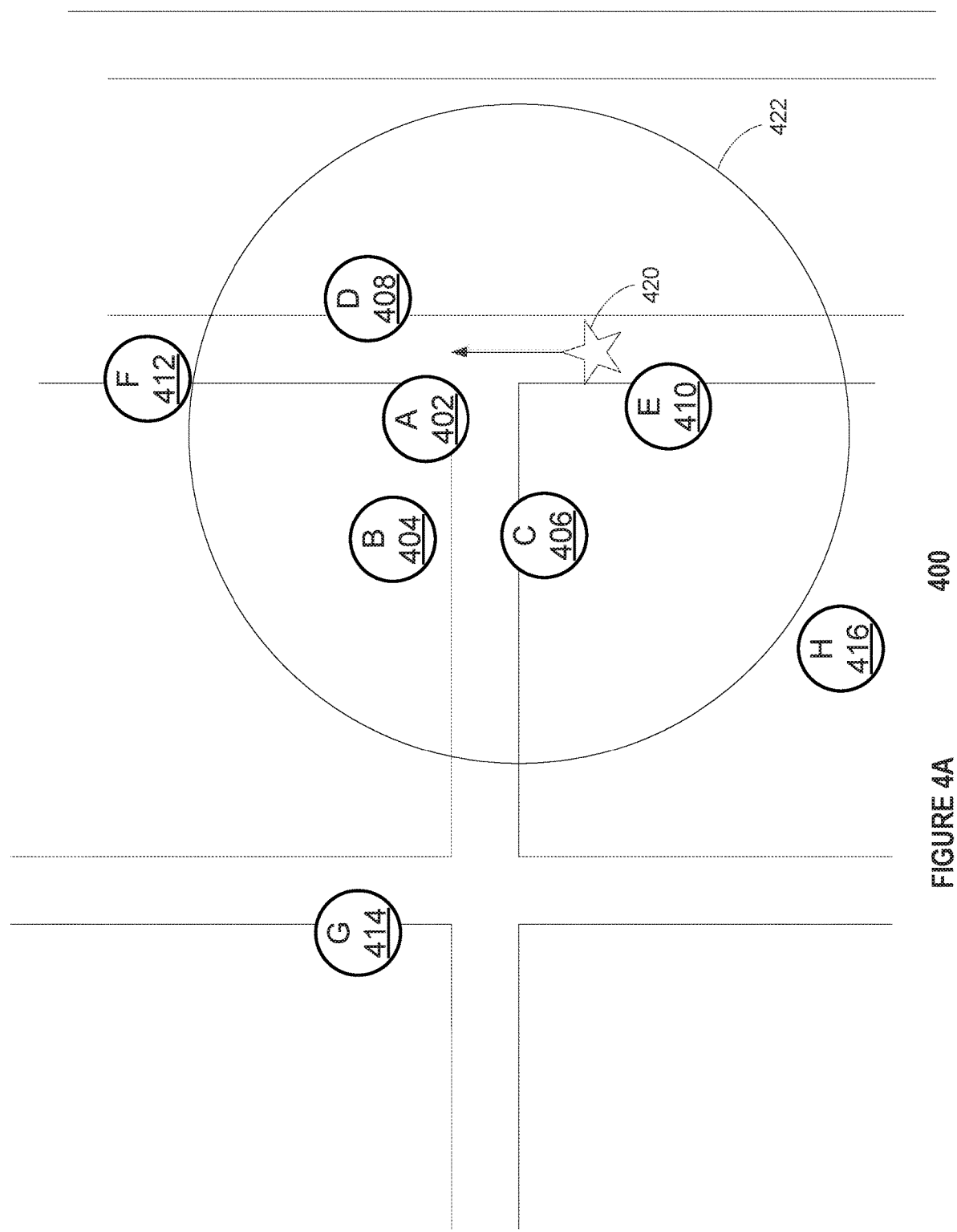

FIG. 4A depicts an internal map 400 of the server system (e.g., server system 120 in FIG. 1) for the purpose of generating a super geo-fence that encompasses one or more selected geo-fences. In this example, the server system has selected five geo-fences to respond to the request from a client system 420. The super geo-fence generation module 124 generates a super geo-fence 422 that encompasses the selected geo-fences (e.g., geo-fences A-E 402, 404, 406, 408, and 410). As seen in FIG. 4A, the generated super geo-fence 422 is as big as possible while encompassing all the selected geo-fences (e.g., geo-fences A-E) but not incorporating any non-selected geo-fence (e.g., geo-fences F-H). For example, the super geo-fence 422 does not include geo-fence F 412, which is the closest non-selected geo-fence. However, the super geo-fence 422 directly borders the boundary for geo-fence F 412, which is as large as possible without encompassing geo-fence F 412.

Client system 420 is represented by e star shape and is moving north towards the super geo-fence 422 boundary.

Figure 4B:
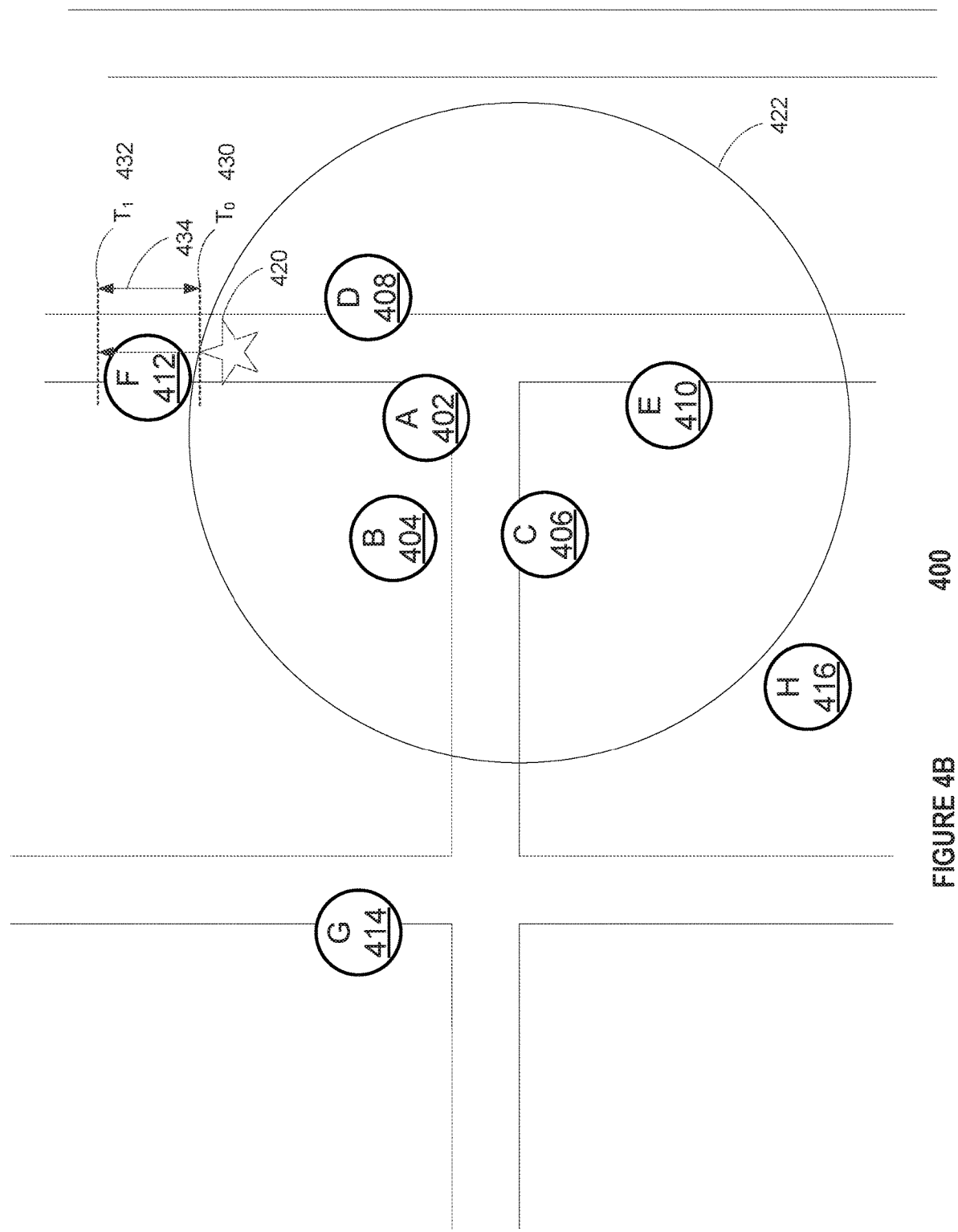

FIG. 4B depicts the internal map 400 of the server system (e.g., server system 120 in FIG. 1) for the purpose of generating a super geo-fence that encompasses one or more selected geo-fences. Continuing the example as seen in FIG. 4A, the client system 420 reaches the boundary of the super geo-fence 422 at time 0 ($T_0$ 430). Reaching the boundary of the super geo-fence 422 causes the client system 420 to send a request for additional geo-fence data. The client system 420 receives this update at time 1 ($T_1$ 432). However, between sending the request at time 0, $T_0$ 430 and receiving the response at time 1, $T_1$ 432, the client system 420 has traveled some distance 434. During this time, the client system 420 can miss updates that represent entering or leaving a geo-fence.

In this example, the client system 420 passes though geo-fence F 412 while waiting for the server to respond to the request. Thus the client system 420 is not able to notify the associated user about the geo-fence and the server system (e.g., server system 120 in FIG. 1) does not receive any notification that the client system 420 has entered or left geo-fence F 412.

FIG. 4C depicts the internal map 400 of the server system (e.g., system 120 in FIG. 1) for the purpose of generating a super geo-fence that encompasses one or more selected geo-fences. Continuing the example as seen in FIGS. 4A and 4B, the server system fixes the problem seen in FIG. 4B by having a reduction module (e.g., reduction module 126 in FIG. 1) determine a reduction factor for reducing the size of the super geo-fence 422. As seen in FIG. 4C, the super geo-fence 422 is reduced to a smaller-sized super geo-fence 450.

The reduced super geo-fence 450 is sized such that when the client system 420 reaches the reduced super geo-fence 450, the response from the server system (e.g., server system 120 in FIG. 1) is received prior to arriving at geo-fence F 412. As seen in FIG. 4C, the client system 420 sends a request when it crosses the boundary of the smaller super geo-fence 450 at time 0 ($T_0$) 438. The server system responds and sends additional geo-fence data such that the client system 420 receives the additional data at time 1 ($T_1$) 440.

Thus, the additional geo-fence data is received from the server system (e.g., server system 120 in FIG. 1) before any additional geo-fences are reached. Therefore, the client system 420 does not miss any geo-fence boundary interactions as it travels.

Figure 5:
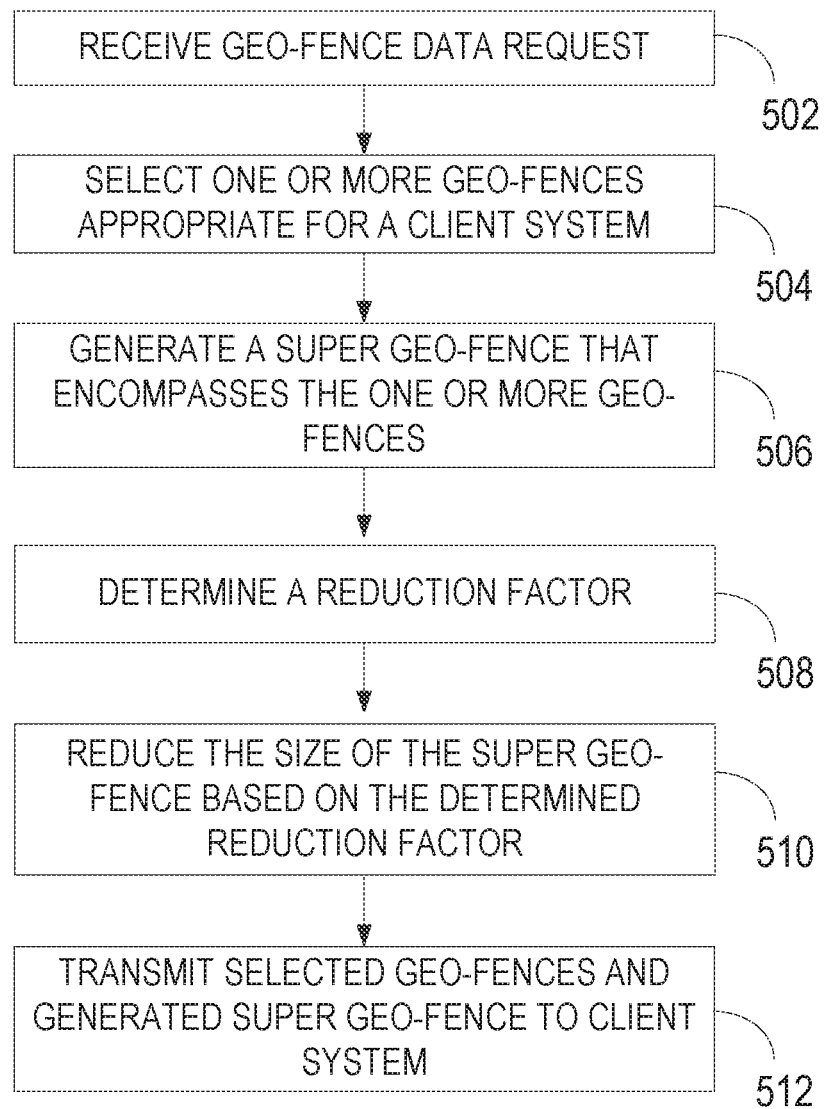
FIG. 5 is a flow diagram illustrating a process for generating a super geo-fence for a group of geo-fences, in accordance with some implementations.

FIG. 5 is a flow diagram illustrating a process for enhancing the efficiency of super geo-fences using a reduction factor to adjust the size of the super geo-fence, in accordance with some implementations. Each of the operations shown in FIG. 5 corresponds, in some embodiments, to instructions stored in a computer memory or computer readable storage medium. In some implementations, the method 500 described with reference to FIG. 5 is performed by a server system (e.g., server system 120 in FIG. 1).

The method 500 is performed at a server system (e.g., system 120 in FIG. 1) including one or more processors and memory storing one or more programs for execution by the one or more processors. The server system receives, at operation 502, a geo-fence data request from a client system (e.g., system 102 in FIG. 1). In some example embodiments, the geo-fence data request is generated at the client system in response to the client system crossing a boundary of a stored super geo-fence. In other embodiments, the request is generated at the client system in response to a geo-fence application staring up.

The server system (e.g., system 120 in FIG. 1) selects, at operation 504 one or more geo-fences that are appropriate to respond to the client system's request. In some example embodiments, the respective locations of the client system and the geo-fences is a determining factor in which geo-fences are selected. In other embodiments, the client system has associated preference information about what kinds of geo-fences the user of the client system is interested in, and the server system selects geo-fences that match the preference data.

The server system generates, at operation 506, a super geo-fence that encompasses the one or more geo-fences. In some example embodiments, the super geo-fence is generated such that some or all the selected geo-fences are within the super geo-fence, but no geo-fences that were not selected are within the super geo-fence. In some example embodiments, the super geo-fence is made as large as possible without overlapping with any non-selected geo-fences.

The server system selects, at operation 508, a reduction factor. A reduction factor represents the size by which the super geo-fence is reduced. In some example embodiments, this is a fixed amount (e.g., 1 mile). In other embodiments, the reduction factor is a percentage of the actual size (e.g., 10%). In yet other embodiments, the reduction factor is selected based on the speed of travel of the client system such that information can be received by the client system from the server system before reaching the original boundary of the super geo-fence.

The server system reduces, at operation 510, the size of the super geo-fence based on the reduction factor. For example, if the super geo-fence is originally 5 miles in diameter and the reduction factor is 1 mile, the server system reduces the size of the super geo-fence without changing its center, such that the diameter is only 4 miles.

The server system transmits, at operation 512, both the one or more selected geo-fences and the generated super geo-fence (once it has been reduced) to the client system. The client system then stores the received geo-fence data.

Figure 6A:
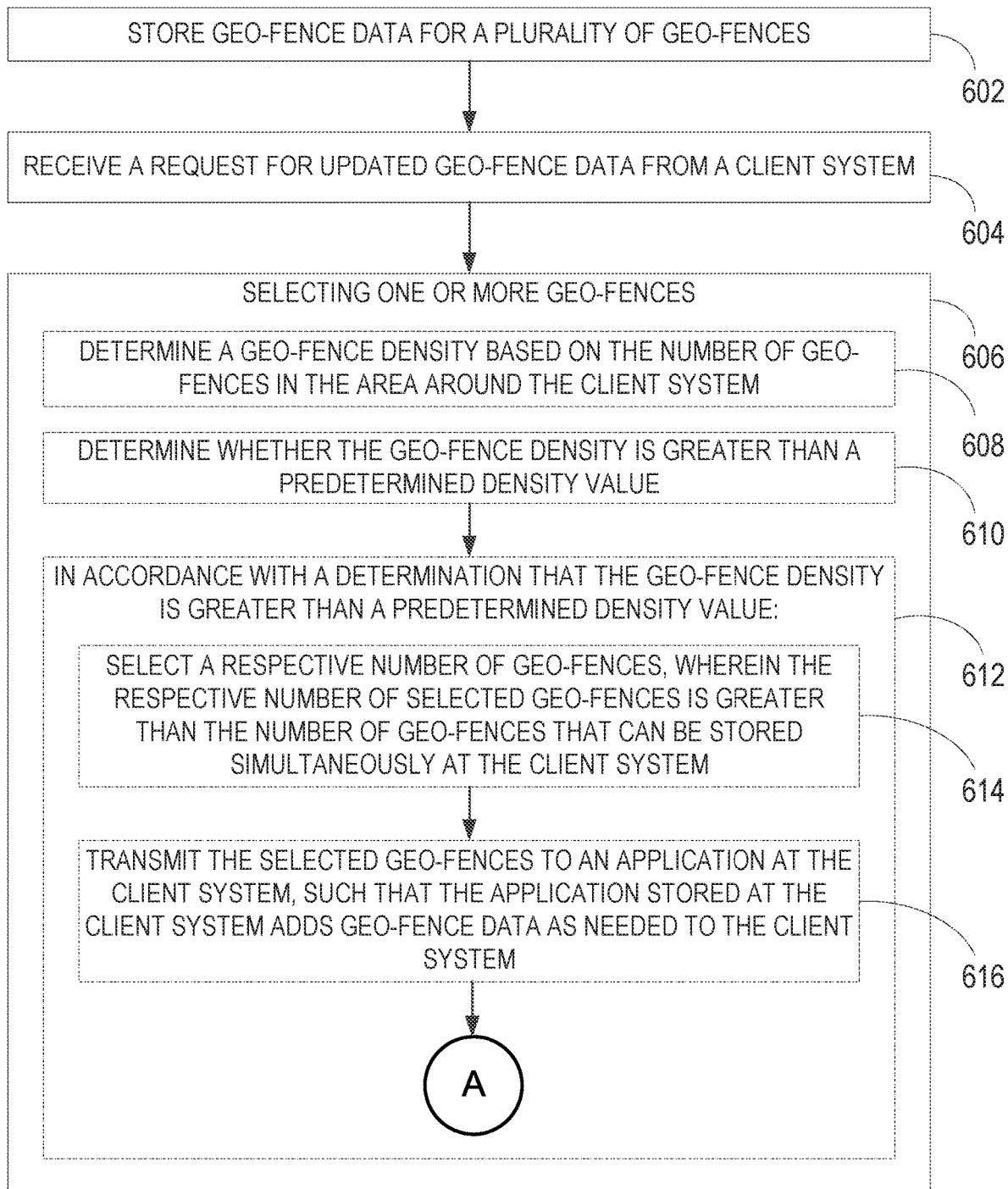
FIGS. 6A-6C are flow diagrams illustrating a process for generating a super geo-fence for a group of geo-fences, in accordance with some implementations.

FIG. 6A is a flow diagram illustrating a method for increasing the efficiency and usefulness of super geo-fences in accordance with some implementations. Each of the operations shown in FIG. 6A may correspond to instructions stored in a computer memory or computer readable storage medium. Optional operations are indicated by dashed lines (e.g., boxes with dashed-line borders). In some implementations, the method described in FIG. 6A is performed by the server system (e.g., server system 120 in FIG. 1), However, the method described can also be performed by any other suitable configuration of electronic hardware.

In some implementations the method is performed at a server system (e.g., system 120 in FIG. 1) including one or more processors and memory storing one or more programs for execution by the one or more processors.

The server system stores, at operation 602, geo-fence data for a plurality of geo-fences. In some example embodiments, each respective geo-fence includes location information associated with the geo-fence including one or more boundaries. For example, the geo-fence data includes, for each geo-fence, a center point and a radius. The geo-fence boundaries are then set as a circle with a center equal to the center point of the geo-fence and a radius equal to the radius of the geo-fence.

The server system receives, at operation 604, a request for updated geo-fence data from a client system (e.g., client system 102 of FIG. 1). The request is generated by a client system in response to the client system determining that it has crossed a stored super geo-fence boundary. The client system determines whether it has crossed a boundary based on periodically determining the location of the client system (e.g., based on global positioning system co-ordinates). For example, if a first position is outside of the area covered by the geo-fence (e.g., outside of the radius distance from the center point) and a second position is then inside the area covered by the geo-fence (e.g., within the radius distance), the client system determines it has crossed the boundary into a geo-fence.

In some example embodiments, the client system is limited such that it can only natively store enough data for a fixed number of geo-fences at a time. For example, certain smartphones only have enough memory dedicated to geo-fence data to store geo-fence data for ten geo-fences natively. However, most client systems also have general purpose memory that can be used by certain applications to store geo-fence data.

In some example embodiments, the client system selects, at operation 606, one or more geo-fences. In some example embodiments, selecting one or more geo-fences includes determining, at operation 608, a geo-fence density based on the number of geo-fences in the area around the client system. For example, the server system determines a general area near the location of the client system and then determines the number of geo-fences within that area. The server system then calculates the ratio of total area to number of geo-fences as the density value.

The server system determines, at operation 610, whether the geo-fence density value is greater that a predetermined geo-fence density value. For example, if the geo-fences in an area are too dense, it can be difficult to effectively group the geo-fences such that a super geo-fence will effectively allow the server system to update the data at the client system in time. In some example embodiments, the predetermined density value varies by area or user preferences. In some example embodiments, the predetermined density value is determined based on the capabilities of the client system (e.g., client system 102 in FIG. 1). In other embodiments, there is no predetermined density value, and instead the server system determines whether the server system can create a super geo-fence that only incorporates selected geo-fences without any non-selected geo-fences.

In some example embodiments, in accordance with a determination that the geo-fence density is greater than a predetermined density value, at operation 612, the server system selects, at operation 614, a respective number of geo-fences, wherein the respective number of selected geo-fences is greater than the number of geo-fences that can be stored simultaneously at the client system. For example, if the client system only has data allocated such that data for five geo-fences can be natively stored at a time, the server system then selects more than five geo-fences. In some example embodiments, the number selected is based on the number of geo-fences within the area currently occupied by the client system.

The server system transmits, at operation 616, the selected geo-fences to an application at the client system, such that the application stored at the client system adds geo-fence data as needed to the client system. For example, the client system has an installed application that is customized to receive geo-fence data from the server system. The installed application receives more application data from the server system than the client system can natively store. The application then transmits geo-fence data as needed as the client system moves from one location to another.

Figure 6B:
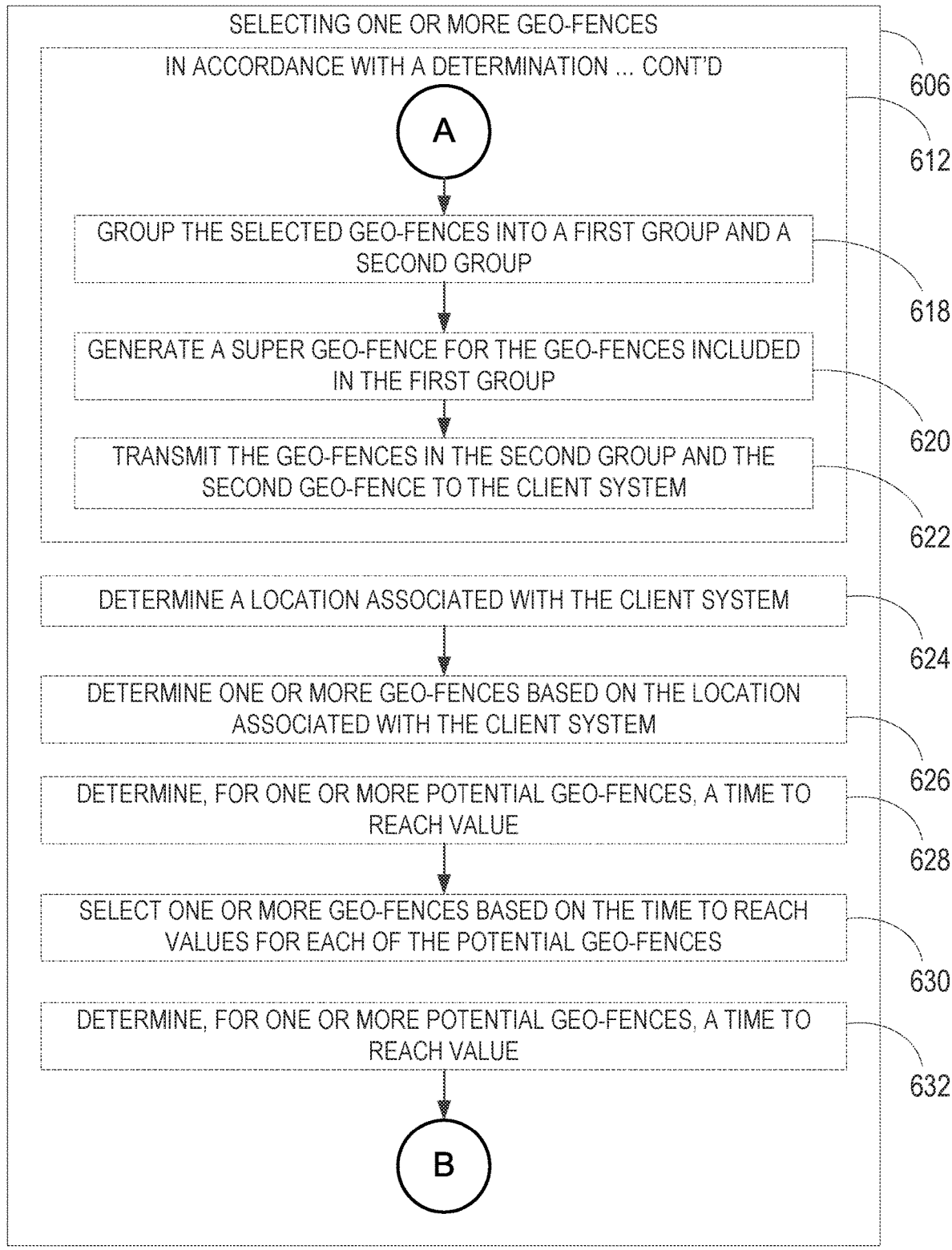

FIG. 6B is a flow diagram illustrating a method for increasing the efficiency and usefulness of super geo-fences in accordance with some implementations. Each of the operations shown in FIG. 6B may correspond to instructions stored in a computer memory or computer readable storage medium. Optional operations are indicated by dashed lines (e.g., boxes with dashed-line borders). In some implementations, the method described in FIG. 6B is performed by the server system (e.g., server system 120 in FIG. 1). However, the method described can also be performed by any other suitable configuration of electronic hardware.

In some implementations, the method is performed at a server system including one or more processors and memory storing one or more programs for execution by the one or more processors.

The server system groups, at operation 618, the selected geo-fences into a first group and a second group. In some example embodiments, both the first group and the second group have fewer geo-fences that the number of geo-fences that can be simultaneously stored natively at the client system (e.g., client system 102 in FIG. 1). The server system generates, at operation 620, a super geo-fence for the geo-fences included in the first group. The server system transmits, at operation 622, the geo-fences in the second group and the second geo-fence to the client system.

In some example embodiments, the server system determines, at operation 624, a location associated with the client system (e.g., client system 102 in FIG. 1). For example, the server system determines a GPS location associated with the client system that represents the physical location of the client system at a given time.

The server system determines, at operation 626, one or more neo-fences based on the location associated with the client system. For example, the server system identifies the ten closest neo-fences to the client system.

The server system determines, at operation 628, for one or more potential geo-fences, a time-to-reach value. The time-to-reach value for each geo-fence is a calculated value that represents the amount of time needed for the client system to travel from the current location to at least one boundary of the geo-fence. The time-to-reach value is based on the total distance, the predicted route, and the predicted speed.

The server system selects, at operation 630, one or more geo-fences based on the calculated time-to-reach values. For example, the server system selects the five geo-fences that have the smallest time to reach values. The server system determines, at operation 632, one of more user preferences for a user of the client system. User preferences indicate the type of geo-fence the user is currently interested in (e.g., a particular type of store or park).

Figure 6C:
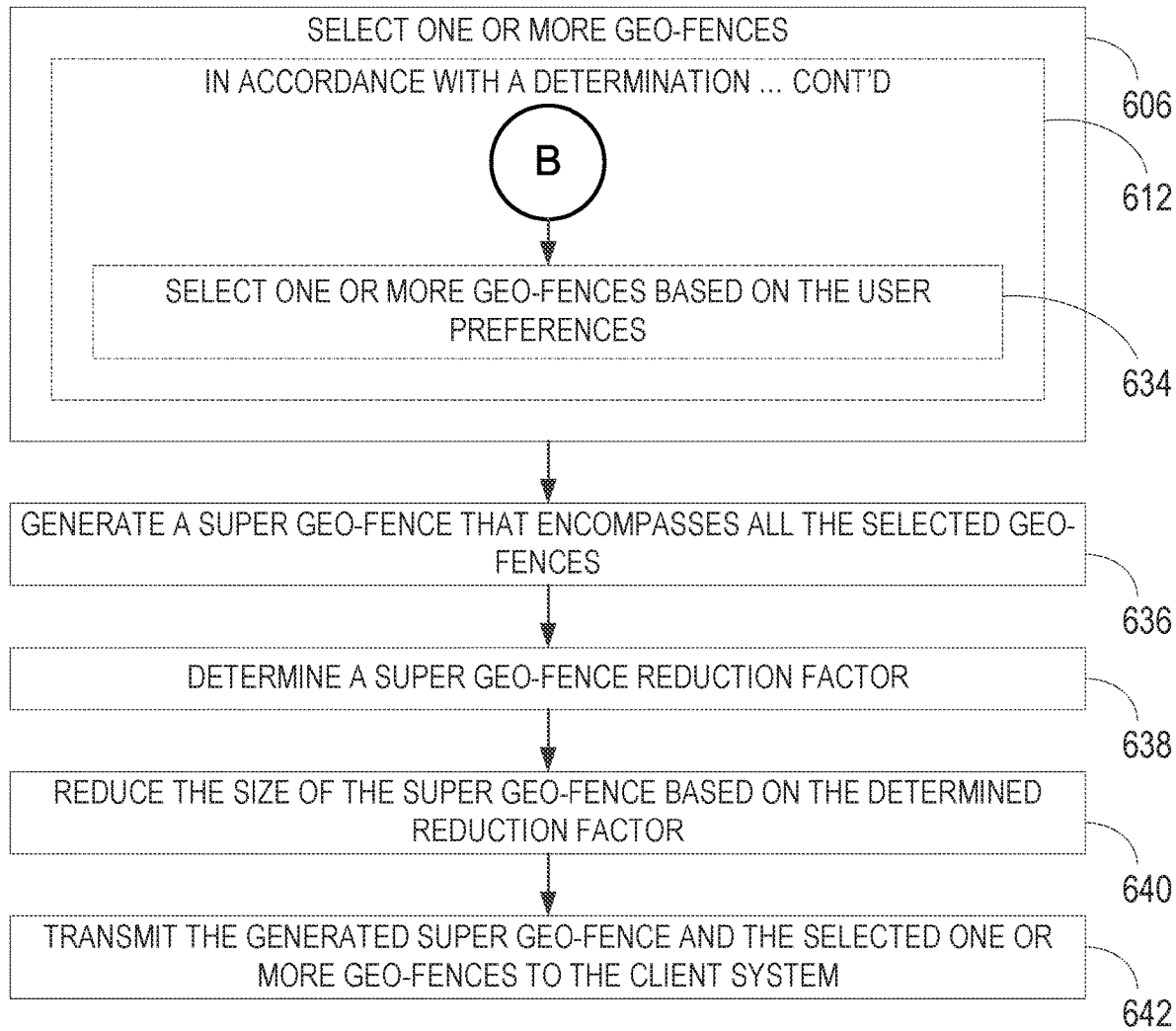

FIG. 6C is a flow diagram illustrating a method for increasing the efficiency and usefulness of super geo-fences in accordance with some implementations. Each of the operations shown in FIG. 6C may correspond to instructions stored in a computer memory or computer readable storage medium. Optional operations are indicated by dashed lines (e.g., boxes with dashed-line borders). In some implementations, the method described in FIG. 6C is performed by the server system (e.g., server system 120 in FIG. 1). However, the method described can also be performed by any other suitable configuration of electronic hardware.

In some implementations, the method is performed at a server system including one or more processors and memory storing one or more programs for execution by the one or more processors. The server system selects, at operation 634, one or more geo-fences based on the user's preferences.

The server system generates, at operation 636, a super geo-fence that encompasses the selected geo-fences. In some example embodiments, the super geo-fence does not encompass any geo-fences that were not selected by the server system.

In some example embodiments, the server system determines, at operation 638, a super geo-fence reduction factor. In some example embodiments the reduction factor is a fixed value. For example, the fixed value is one mile. In other embodiments, the reduction factor is a percentage of the original super geo-fence size.

In some example embodiments, the server system reduces, at operation 640, the size of the super geo-fence based on the determined reduction factor, and transmits, at operation 642, the generated super geo-fence and the selected one or more geo-fences to the client system.

Software Architecture

Figure 7:
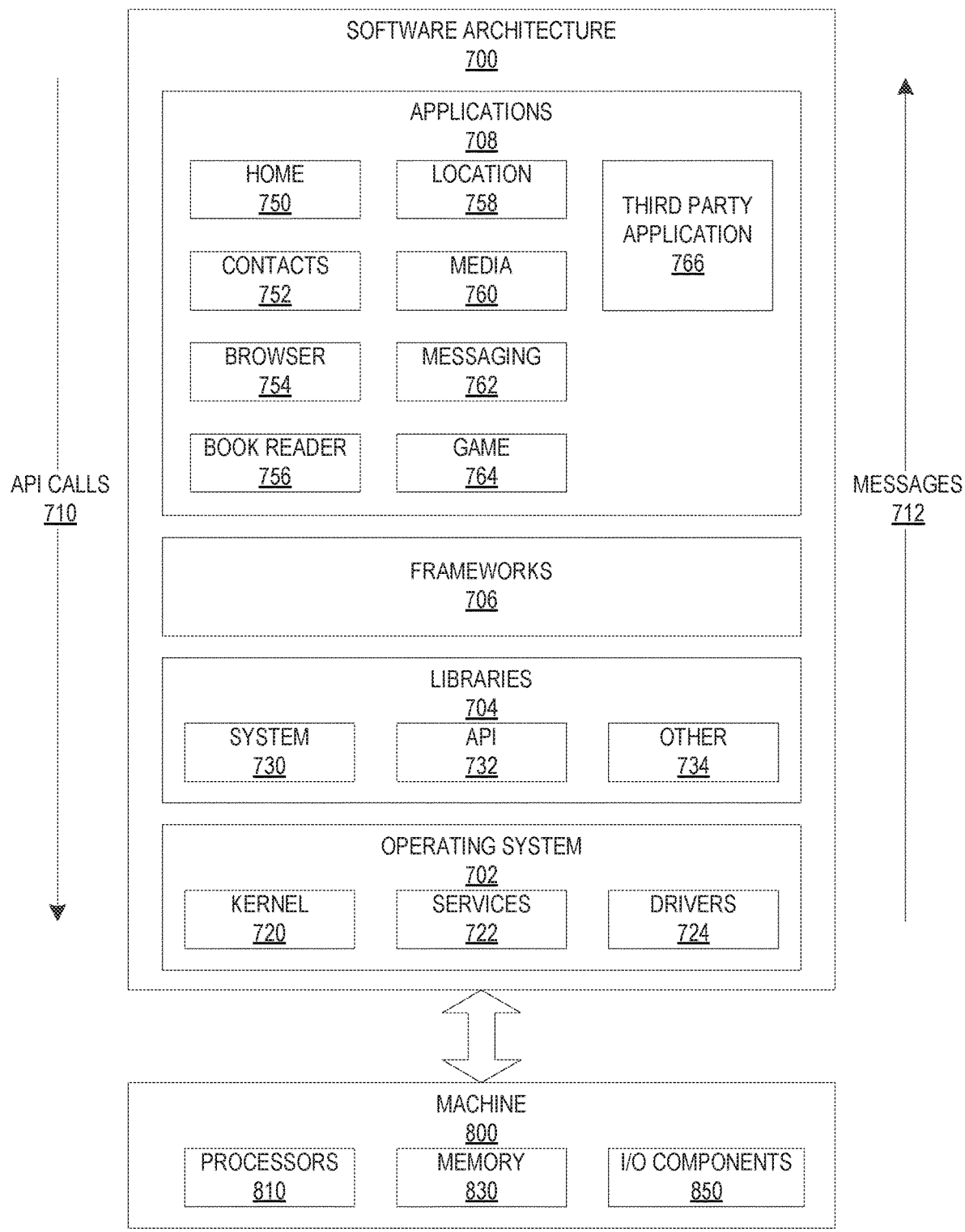
FIG. 7 is a block diagram illustrating an architecture of software, which may be installed on any one or more of devices of a computer system.

FIG. 7 is a block diagram illustrating an architecture of software 700, which may be installed on any one or more of devices of FIG. 1 (e.g., client system(s) 102). FIG. 7 is merely a non-limiting example of a software architecture and it will be appreciated that many other architectures may be implemented to facilitate the functionality described herein. The software 700 may be executing on hardware such as machine 800 of FIG. 8 that includes processors 810, memory 830, and I/O components 850. In the example architecture of FIG. 7, the software 700 may be conceptualized as a stack of layers where each layer may provide particular functionality. For example, the software 700 may include layers such as an operating system 702, libraries 704, frameworks 706, and applications 708. Operationally, the applications 708 may invoke application programming interface (API) calls 710 through the software stack and receive messages 712 in response to the API calls 710.

The operating system 702 may manage hardware resources and provide common services. The operating system 702 may include, for example, a kernel 720, services 722, and drivers 724. The kernel 720 may act as an abstraction layer between the hardware and the other software layers. For example, the kernel 720 may be responsible for memory management, processor management (e.g., scheduling), component management, networking, security settings, and so on. The services 722 may provide other common services for the other software layers. The drivers 724 may be responsible for controlling and/or interfacing with the underlying hardware. For instance, the drivers 724 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 704 may provide a low-level common infrastructure that may be utilized by the applications 708. The libraries 704 may include system libraries 730 (e.g., C standard library) that may provide functions such as memory allocation functions, string manipulation functions, mathematic functions, and the like. In addition, the libraries 704 may include API libraries 732, such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 704 may also include a wide variety of other libraries 734 to provide many other APIs to the applications 708.

The frameworks 706 may provide a high-level common infrastructure that may be utilized by the applications 708. For example, the frameworks 706 may provide various graphic user interface (GUI) functions, high-level resource management, high-level location services, and so forth. The frameworks 706 may provide a broad spectrum of other APIs that may be utilized by the applications 708, some of which may be specific to a particular operating system or platform.

The applications 708 include a home application 750, a contacts application 752, a browser application 754, a book reader application 756, a location application 758, a media application 760, a messaging application 762, a game application 764, and a broad assortment of other applications such as third party application 766. In a specific example, the third party application 766 (e.g,, an application developed using the Androidmt or iOS™ software development kit (SDK) by an entity other than the vendor of the particular platform) may be mobile software running on a mobile operating system such as iOS™, Android™, Windows® Phone, or other mobile operating systems. In this example, the third party application 766 may invoke the API calls 710 provided by the mobile operating system 702 to facilitate functionality described herein.

Example Machine Architecture and Machine-Readable Medium

Figure 8:
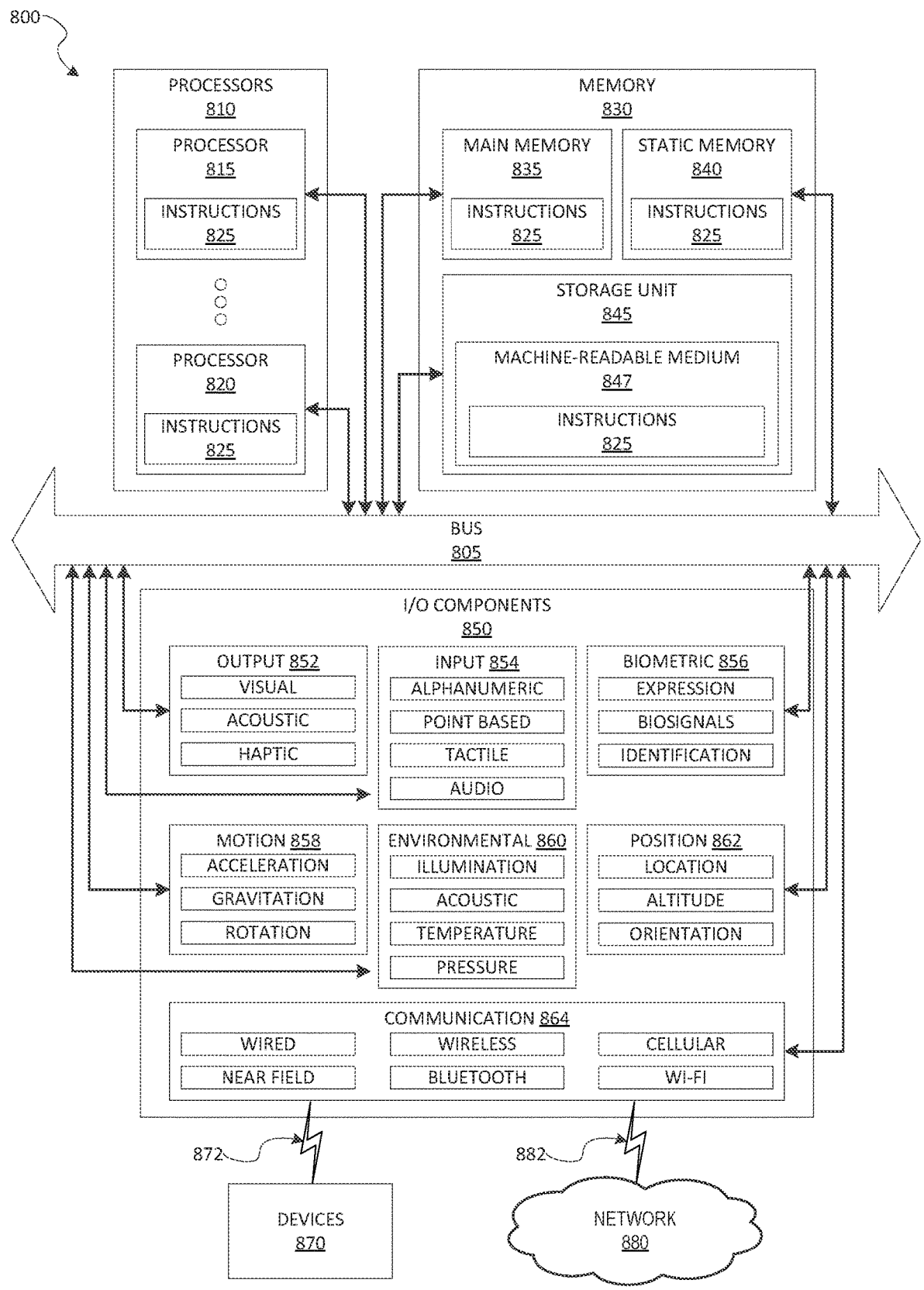
FIG. 8 is a block diagram illustrating components of a machine, according to some example embodiments.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 825 (e.g., software, a program, an application, an applet, an app, or other executable code) for causing the machine 800 to perform any one or more of the methodologies discussed herein may be executed. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but be not limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 825, sequentially or otherwise, that specify actions to be taken by machine 800. Further, while only a single machine 800 is illustrated, the term "machine" shall also be taken to include a collection of machines 800 that individually or jointly execute the instructions 825 to perform any one or more of the methodologies discussed herein.

The machine 800 may include processors 810, memory 830, and I/O components 850, which may be configured to communicate with each other via a bus 805. In an example embodiment, the processors 810 (e.g., a CPU, a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 815 and processor 820 that may execute instructions 825. The term "processor" is intended to include a multi-core processor that may comprise two or more independent processors (also referred to as "cores") that may execute instructions contemporaneously. Although FIG. 8 shows multiple processors 810, the machine 800 may include a single processor with a single core, a single processor with multiple cores (e.g., a multi-core process), multiple processors with a single core, multiple processors with multiples cores, or any combination thereof.

The memory 830 may include a main memory 835, a static memory 840, and a storage unit 845 accessible to the processors 810 via the bus 805. The storage unit 845 may include a machine-readable medium 847 on which are stored the instructions 825 embodying any one or more of the methodologies or functions described herein. The instructions 825 may also reside, completely or at least partially, within the main memory 835, within the static memory 840, within at least one of the processors 810 (e.g., within the processor's cache memory), or any suitable combination thereof, during execution thereof by the machine 800.

Accordingly, the main memory 835, static memory 840, and the processors 810 may be considered as machine-readable media 847.

As used herein, the term "memory" refers to a machine-readable medium 847 able to store data temporarily or permanently and may be taken to include, but not be limited to, random-access memory (RAM), read-only memory (ROM), buffer memory, flash memory, and cache memory. While the machine-readable medium 847 is shown in an example embodiment to be a single medium, the term "machine-readable medium" should be taken to include a single medium or multiple media (e.g., a centralized or distributed database, or associated caches and servers) able to store instructions 825. The term "machine-readable medium" shall also be taken to include any medium, or combination of multiple media, that is capable of storing instructions (e.g., instructions 825) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

The I/O components 850 may include a wide variety of components to receive input, provide and/or produce output, transmit information, exchange information, capture measurements, and so on. It will be appreciated that the I/O components 850 may include many other components that are not shown in FIG. 8. In various example embodiments, the I/O components 850 may include output components 852 and/or input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, and/or other pointing instrument), tactile input components (e.g., a physical button, a touch screen that provide location and force of touches or touch gestures, and/or other tactile input components), audio input components (e.g., a microphone), and the like.

In further example embodiments, the I/O components 850 may include biometric components 856, motion components 858, environmental components 860, and/or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), and/or other components that may provide indications, measurements, and/or signals corresponding to a surrounding physical environment. The position components 862 may include location sensor components (e.g., a GPS receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 and/or devices 870 via coupling 882 and coupling 872 respectively. For example, the communication components 864 may include a network interface component or other suitable device to interface with the network 880. In further examples, communication components 864 may include wired communication components, wireless communication components, cellular communication components, Near Field Communication (NEC) components, Bluetooth® components (e.g., Bluetooth® Low Energy), Wi-Fi® components, and other communication components to provide communication via other modalities. The devices 870 may be another machine and/or any of a wide variety of peripheral devices (e.g., a peripheral device coupled via a USB).

Moreover, the communication components 864 may detect identifiers and/or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In additional, a variety of information may be derived via the communication components 864 such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 880 may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data. Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 825 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 825 may be transmitted and/or received using a transmission medium via the coupling 872 (e.g., a peer-to-peer coupling) to devices 870. The term "transmission medium" shall be taken to include any intangible medium that is capable of storing, encoding, or carrying instructions 825 for execution by the machine 800, and includes digital or analog communications signals or other intangible medium to facilitate communication of such software.

Furthermore, the machine-readable medium 847 is non-transitory (in other words, not having any transitory signals) in that it does not embody a propagating signal. However, labeling the machine-readable medium 847 as "non-transitory" should not be construed to mean that the medium is incapable of movement; the medium 847 should be considered as being transportable from one physical location to another. Additionally, since the machine-readable medium 847 is tangible, the medium may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   generating an initial boundary that encompasses a set of two or more geo-fences;
   receiving an input that includes a velocity value from the client system, the velocity value indicating a speed at which the client system is travelling;
   determining a reduction factor based on the velocity value included in the input received from the client system and an estimated amount of time for the client system to receive additional geo-fence data from a server system; and
   reducing the initial boundary that encompasses the set of two or more geo-fences based on the reduction factor, yielding a revised boundary that is smaller than the initial boundary.

2. The method of claim 1, wherein the velocity value indicates a device velocity of the client system.

3. The method of claim 1, wherein generating the initial boundary that encompasses the set of two or more geo-fences comprises:
   identifying the set of two or more geo-fences from among a plurality of geo-fences based on a set of identification factors.

4. The method of claim 3, wherein the set of identification factors include one or more of:
   a set of user preferences associated with the client system; and
   a location of the client system.

5. The method of claim 1, wherein generating the initial boundary that encompasses the set of two or more geo-fences comprises:
   receiving a request for geo-fence data from the client system; and
   generating the initial boundary that encompasses the set of two or more geo-fences in response to the request for geo-fence data from the client system.

6. The method of claim 1, wherein the reduction factor is a fixed value, the initial boundary comprises a diameter, and reducing the initial boundary that encompasses the set of two or more geo-fences comprises:
   reducing the diameter of the initial boundary based on the fixed value of the reduction factor.

7. The method of claim 1, wherein the reduction factor is a percentage value, the initial boundary defines a total area encompassed by the initial boundary, and reducing the initial boundary that encompasses the set of two or more geo-fences comprises:
   reducing the total area encompassed by the initial boundary based on the percentage value of the reduction factor.

8. A system comprising:
   one or more computer processors; and
   one or more computer-readable mediums storing instructions that, when executed by the one or more computer processors, causes the system to perform operations comprising:
      generating an initial boundary that encompasses a set of two or more geo-fences;
      receiving an input that includes a velocity value from the client system, the velocity value indicating a speed at which the client system is travelling;

determining a reduction factor based on the velocity value included in the input received from the client system and an estimated amount of time for the client system to receive additional geo-fence data from a server system; and reducing the initial boundary that encompasses the set of two or more geo-fences based on the reduction factor, yielding a revised boundary that is smaller than the initial boundary.

9. The system of claim 8, wherein the velocity value indicates a device velocity of the client system.

10. The system of claim 8, wherein generating the initial boundary that encompasses the set of two or more geo-fences comprises:

identifying the set of two or more geo-fences from among a plurality of geo-fences based on a set of identification factors.

11. The system of claim 10, wherein the set of identification factors include one or more of:

a set of user preferences associated with the client system; and a location of the client system.

12. The system of claim 8, wherein generating the initial boundary that encompasses the set of two or more geo-fences comprises:

receiving a request for geo-fence data from the client system; and generating the initial boundary that encompasses the set of two or more geo-fences in response to the request for geo-fence data from the client system.

13. The system of claim 8, wherein the reduction factor is a fixed value, the initial boundary comprises a diameter, and reducing the initial boundary that encompasses the set of two or more geo-fences comprises:

reducing the diameter of the initial boundary based on the fixed value of the reduction factor.

14. The system of claim 8, wherein the reduction factor is a percentage value, the initial boundary defines a total area encompassed by the initial boundary, and reducing the initial boundary that encompasses the set of two or more geo-fences comprises:

reducing the total area encompassed by the initial boundary based on the percentage value of the reduction factor.

15. A non-transitory computer-readable medium storing instructions that, when executed by one or more computer processors of one or more computing devices, causes the one or more computing devices to perform operations comprising:

generating an initial boundary that encompasses a set of two or more geo-fences;

receiving an input that includes a velocity value from the client system, the velocity value indicating a speed at which the client system is travelling;

determining a reduction factor based on the velocity value included in the input received from the client system and an estimated amount of time for the client system to receive additional geo-fence data from a server system; and reducing the initial boundary that encompasses the set of two or more geo-fences based on the reduction factor, yielding a revised boundary that is smaller than the initial boundary.

16. The non-transitory computer-readable medium of claim 15, wherein the velocity value indicates a device velocity of the client system.

17. The non-transitory computer-readable medium of claim 15, wherein generating the initial boundary that encompasses the set of two or more geo-fences comprises:

identifying the set of two or more geo-fences from among a plurality of geo-fences based on a set of identification factors.

18. The non-transitory computer-readable medium of claim 15, wherein generating the initial boundary that encompasses the set of two or more geo-fences comprises:

receiving a request for geo-fence data from the client system; and generating the initial boundary that encompasses the set of two or more geo-fences in response to the request for geo-fence data from the client system.

19. The non-transitory computer-readable medium of claim 15, wherein the reduction factor is a fixed value, the initial boundary comprises a diameter, and reducing the initial boundary that encompasses the set of two or more geo-fences comprises:

reducing the diameter of the initial boundary based on the fixed value of the reduction factor.

20. The non-transitory computer-readable medium of claim 15, wherein the reduction factor is a percentage value, the initial boundary defines a total area encompassed by the initial boundary, and reducing the initial boundary that encompasses the set of two or more geo-fences comprises:

reducing the total area encompassed by the initial boundary based on the percentage value of the reduction factor.

* * * * *